United States Patent [19]

Krishnakumar et al.

[11] Patent Number: 5,032,341
[45] Date of Patent: Jul. 16, 1991

[54] METHOD OF FORMING TWO MATERIAL THREE/FIVE LAYER PREFORM

[75] Inventors: Suppayan M. Krishnakumar, Nashua; Thomas E. Nahill, Amherest; Steven L. Schmidt; Wayne N. Collette, both of Merrimack, all of N.H.

[73] Assignee: Continental PET Technologies, Inc., Danbury, Conn.

[21] Appl. No.: 436,651

[22] Filed: Nov. 15, 1989

Related U.S. Application Data

[62] Division of Ser. No. 292,440, Dec. 30, 1988, Pat. No. 4,954,376.

[51] Int. Cl.$^5$ .............................................. B29C 45/16
[52] U.S. Cl. .................................. 264/255; 264/513; 425/130
[58] Field of Search ..................... 264/45.1, 46.6, 255, 264/513, 516, 328.8; 425/130

[56] References Cited

U.S. PATENT DOCUMENTS

| | | | |
|---|---|---|---|
| 4,459,257 | 7/1984 | Baciu | 264/255 |
| 4,550,043 | 10/1985 | Beck | 220/415 |
| 4,808,101 | 2/1989 | Schad et al. | 425/130 |

Primary Examiner—Jan H. Silbaugh
Assistant Examiner—Angela Ortiz
Attorney, Agent, or Firm—Charles E. Brown

[57] ABSTRACT

A plastic preform from which a plastic container is blow molded. The preform replaces a three layer preform by providing a preform which is of a five layer construction in the base forming portion thereof and wherein a secondary material which forms the core layer of the three layer preform construction is divided into an inner intermediate layer and an outer intermediate layer by a third injection of material. The third injected material is preferably the same material as the primary material which is first injected. This results in the reduction of the cost of the preform and also provides remaining in the injection nozzle a quantity of the last injected material which is the same as the first injected material for the following preform in the same preform injection mold cavity.

3 Claims, 1 Drawing Sheet

A — METERED PET
B — METERED MAT'L "X"
C — EXTRUDER PET

METHOD OF FORMING TWO MATERIAL THREE/FIVE LAYER PREFORM

This is a division of application Ser. No. 07/292,440 filed Dec. 30, 1988, now U.S. Pat. No. 4,954,376.

This invention relates in general to new and useful improvements in plastic preforms from which plastic containers are blow molded, and most particularly to a plastic preform which is of a laminated construction.

BACKGROUND OF THE INVENTION

Polyethylene terephythalate (PET) preforms and containers blow molded from such preforms are well known. However, PET per se does not have all of the necessary characteristics desired for containers. Accordingly, there has been developed a laminated preform which is primarily of a five layer construction including PET inner and outer layers, inner and outer intermediate barrier layers and a core which may be formed of PET or some other plastic. Krishnakumar et al. 4,609,516 granted Sept. 2, 1986 and Beck 4,550,043 granted Oct. 29, 1985 are typical recent patents granted with respect to laminated preforms and containers blow molded therefrom.

SUMMARY OF THE INVENTION

This invention in particular relates to a plastic preform which is primarily of a three layer construction including inner and outer PET layers and an intermediate core layer. Such preforms are also known but have the deficiency of the core layer material being more expensive than PET and further being unnecessary in the base portion of the resultant blow molded container due to the lack of biaxial orientation of the base portion and therefore a lack of reduction of thickness of the preform portion which forms the base portion of the resultant container.

This invention in particular relates to a third injection of plastic material into a preform injection mold cavity to complete the preform with this third injection of plastic material forming a core within the original core material and permitting the replacement of the more expensive core material in the base forming portion of the preform.

Further, while suitable apparatus has been devised for the sequential injection of different plastic materials into a preform injection mold cavity, it is to be understood that a nozzle through which the plastic material is injected into the preform injection mold cavity will have retained therein a small portion of the last injected material. The net result is that this retained plastic material within the nozzle becomes the first injected material in the formation of a next preform in the same preform injection mold cavity. It is undesirable to have the first injected plastic material into the preform injection mold cavity that which forms the core of a three layer preform. However, by making the last injected material the same or substantially the same as the first injected material, namely PET, this deficiency of the present molding apparatus can also be overcome.

Most particularly, in accordance with this invention, there is a first injection of a metered amount of a primary plastic material followed by a second injection of a metered amount of a secondary plastic material with the secondary plastic material serving to advance a first injected primary material into the preform injection mold cavity with the first injected material being wiped along the walls of the injection mold cavity and the secondary material forming a core between inner and outer layers of the primary material. By controlling the volumes of the two injected materials, particularly the secondary material, and then filling the preform injection mold cavity by way of a third injection, the quantity of the secondary material may be greatly reduced. Further, by making the third injected material the same as the primary material, there remains in the injection nozzle to be first introduced into the preform injection mold cavity in the formation of the next following preform the same material as the primary material whereby the tip end of a neck finish portion of a preform will be of the desired material.

With the above and other objects in view that will hereinafter appear, the nature of the invention will be more clearly understood by reference to the following detailed description, the appended claims, and the several views illustrated in the accompanying drawings.

DESCRIPTION OF THE INVENTION

Figure 1:
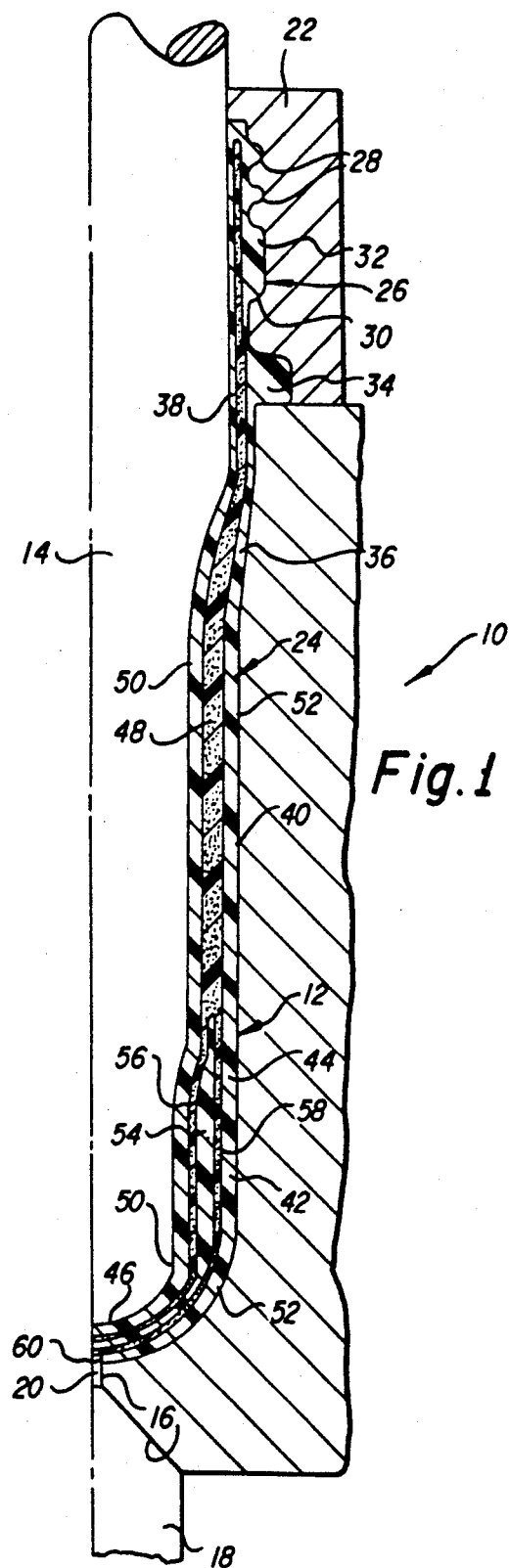
FIG. 1 is a half sectional view taken through a conventional preform injection mold which has injected molded therein a preform of a three/five layer construction in accordance with the invention.

Referring now to the drawings in detail, it will be seen that there is illustrated in FIG. 1 a conventional preform injection mold identified by the numeral 10. The mold 10 is preferably of a multiple cavity type having a plurality of cavities 12 in which there is positioned a core 14. Each cavity 12 is provided with a base opening defining a seat 16 for an injection nozzle 18. The opening in the base of the mold 10 also includes a sprue opening 20 into the bottom of the cavity 12.

The mold 10 has associated therewith an openable neck ring 22 which is separable in sequence first from the mold 10 in conjunction with the core 14 to withdraw an injected preform, such as the preform 24, from the cavity 12 and then from the core 14 to release the molded preform 24, normally after the preform 24 has been stripped from the core 14.

The illustrated preform 24 includes a neck finish portion generally identified by the numeral 26 and including outer threads 28, a tamper band retaining shoulder 30 formed by a ring 32, and a support or capping flange 34.

Below the neck finish forming portion 26, the preform 24 includes a shoulder forming portion 36 which is of a tapered increasing thickness and which is connected to the neck finish forming portion 26 by a short ring portion 38.

Below the shoulder forming portion 36 is an elongated body forming portion 40 which is substantially cylindrical except for the slight taper of the cavity 12 and the core 14 and which is of a uniform thickness. The body forming portion 40 terminates in a base forming portion 42 which includes a cylindrical part 44 and a generally hemispherical bottom part 46. At this time it is pointed out that the cylindrical part 44 increases in thickness as compared to the body forming portion 40.

The preform 24 is formed generally in accordance with the patent to Pocock et al 4,525,401 granted June 25, 1985 wherein the base forming portion is of a greater wall thickness so as to permit a reduction in thickness of the intermediate or core forming layer.

Figure 2:
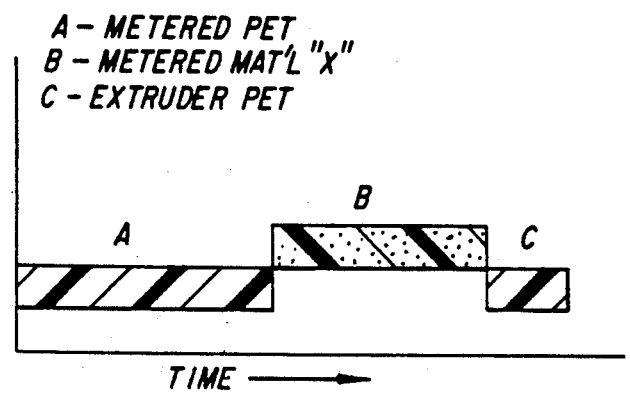
FIG. 2 is a diagram showing the injection sequence time of the three injections of plastic material into the preform mold cavity.

As is best shown in FIG. 2, the preform 24 is formed by the sequential injection of molten plastic material into the cavity 12. A preselected metered amount of a primary material A is first injected into the bottom portion of the cavity 12 through the nozzle 18. Next, a preselected metered amount of a secondary material B is injected into the cavity 12 with the material B forcing the material A into the cavity 12 with the material A adhering to the cavity walls as it passes into the cavity and the material B entering into the separated layers of the material A in the manner generally disclosed in the Krishnakumar et al and Beck patents.

Previously, only the amount of the material A was metered, with the material B being injected in a quantity to completely fill the cavity 12. However, in view of the fact that the material B will normally be more expensive than the material A, it is desired to restrict the use of the material B, particularly in the base forming portion 42. In accordance with this inVention, this is accomplished by a third separate injection of molten plastic material, material C, into the mold cavity 12 to complete the filling of the mold cavity 12. The material C is located substantially entirely within the base forming portion 42 as is clearly shown in FIG. 1.

At this time it is pointed out that the injection of the material C results in a material saving of the material B to the extent of the quantity of the material C.

Further, it is to be noted from FIG. 1 that the last injected material will not only fill the screw opening 20, but also the final injection passage of the nozzle 18, which final injection passage is customary and not shown. It will be thus apparent that the quantity of the material C remaining within the final nozzle passage will be that material which is first injected into the cavity 12 in the formation of the next following preform 24. In the past, it has been found undesirable to inject a limited quantity of the material B at the beginning of the injection molding cycle.

In the illustrated preform 26, it will be seen that the material B extends substantially to the top of the neck finish portion 26 although it may terminate lower in the neck finish portion 26, depending upon the amount of the material A which is initially injected into the cavity 12. The material B accordingly forms a core 48 separating the material A into an inner layer 50 and an outer layer 52. Thus, the preform 24 is primarily of a three layer construction.

At the present state of the plastic material art, virgin PET material is the preferred material for material A. On the other hand, depending upon the usage of the resultant container, the material B may be selected from a variety of materials including colored PET, recycled PET, MXD-6 nylon; copolyesters, polypropylyene (PP), PP/PET blend, polyacrylonitrile, polycarbonate, and the like.

Prior to this invention, the material A would constitute 40-60% of the volume of the preform 24 while the material B would constitute the remainder of the volume of the preform 24 thus varying between 40 and 60% of the total volume. In accordance with this invention, there can be a material saving of the material B by filling the cavity 12 with the material C. The percent volume of the material B can be reduced to 30-40 while the percent volume of the material C will be between 10 and 20.

Referring once again to FIG. 1, it will be seen that in the base forming portion 42, the material C forms a core layer 54 within the layer 48, dividing the layer 48 into an inner intermediate layer 56 and an outer intermediate layer 58 while the inner layer 50 and the outer layer 52 remains substantially the same. Thus the base forming portion 42 is of a five layer construction.

Further, as is clearly shown at the bottom of the preform 24, the last injected plastic material is the plastic material C which is in the form of a sprue 60 that extends through the outer intermediate layer 58 and the outer layer 52. As stated above, the material C is preferably the same as the material A, namely PET.

Figure 3:
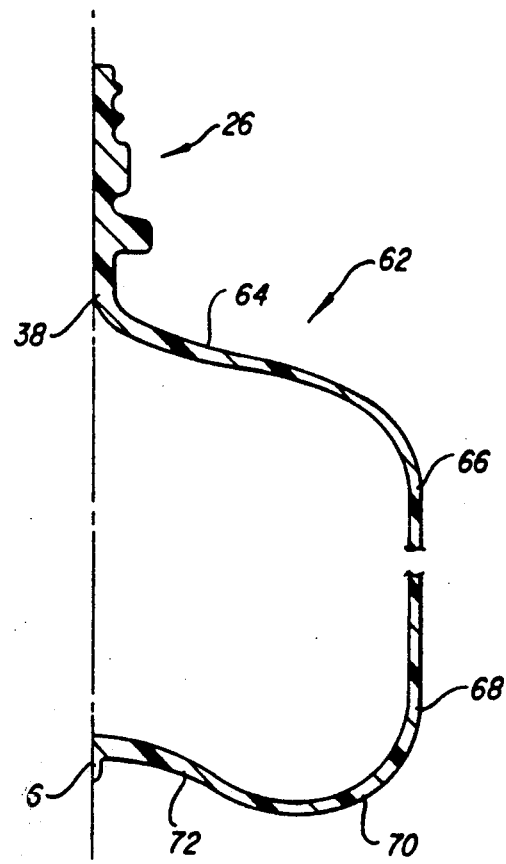
FIG. 3 is a half sectional view taken through a container blow molded from the preform of FIG. 1 with intermediate parts of the container body being broken away, the different layers not being shown.

Referring now to FIG. 3, it will be seen that the preform 24 is blow molded to form, in a conventional manner, a container 62. The container 62 will have a neck finish portion 26 identical to that of the preform 24. It will also include an unstretched and thus unoriented ring portion corresponding to the ring portion 38.

On the other hand, the shoulder forming portion 36 will be gradually stretched both axially and radially to be of a decreasing thickness and increasing biaxial orientation to define a shoulder 64.

The body forming portion 40 of the preform 24 will be both axially and radially materially stretched to form a highly biaxially oriented container body 66. Finally, the base forming portion 42 of the preform 24 will become an outer generally cylindrical base portion 68, a supporting curved annulus 70 and a bottom wall 72. It will be seen that the base of the container 62 gradually increases in thickness towards the center of the base with the center of the base being substantially unstretched and of the same thickness as the extreme bottom of the preform 24.

From the foregoing, It will be seen that the conventional three layer container may be modified so that the base of such a container is essentially of a five layer construction while the body portion 66 and the upper part of the container will be of a three layer construction. On the other hand, the great reduction of the secondary material in the container base in no way detracts from the appearance, strength or possible barrier characteristics of the resultant container. Thus, in accordance with this invention the container 62 may be made at a lesser material cost than a like container which is solely of a three layer construction.

Although only a preferred embodiment of the preform has been specifically illustrated and described herein, it is to be understood that the preform may be varied without departing from the spirit and scope of the inventIon as defined by the appended claims.

We claim:

1. A method of forming in an injection mold cavity for a preform a plastic preform in part formed of three layers and in part formed of five layers, said method comprising the steps of first injecting into said preform mold cavity a metered quantity of a primary material, then injecting into said mold cavity a metered quantity of a secondary material to form a core layer within said primary material to form only a three layer construction, and finally injecting further material which is less expensive than said secondary material, thereby filling said preform mold cavity and forming a further core layer within said secondary material in only a last formed preform container base forming portion to provide a five layer construction with said only three layer construction being extensive and forming a body portion of preform above said preform container base forming portion of five layer construction, said less expensive further material replacing secondary material in said base forming portion and thereby materially reducing the quantity of secondary material required to form the preform.

2. A method according to claim 1 wherein said further material is different from and less expensive than said secondary material.

3. A method according to claim 1 wherein said further material is the same as said primary material whereby the first and last injected materials are the same.